(12) United States Patent
Sohn

(10) Patent No.: US 9,766,467 B2
(45) Date of Patent: Sep. 19, 2017

(54) COLOR SPLITTER, METHOD OF MANUFACTURING THE SAME, AND IMAGE SENSOR INCLUDING THE SAME

(71) Applicant: SAMSUNG ELECTRONICS CO., LTD., Suwon-si (KR)

(72) Inventor: Jinseung Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/887,962

(22) Filed: Oct. 20, 2015

(65) Prior Publication Data

US 2016/0109716 A1    Apr. 21, 2016

(30) Foreign Application Priority Data

Oct. 20, 2014    (KR) ........................ 10-2014-0141693

(51) Int. Cl.
    *G02B 27/12*    (2006.01)
    *H01L 31/0232*    (2014.01)
    *G02B 27/10*    (2006.01)

(52) U.S. Cl.
    CPC ....... *G02B 27/123* (2013.01); *G02B 27/1013* (2013.01)

(58) Field of Classification Search
    CPC .... G02B 27/12; G02B 27/123; G02B 27/126; G02B 5/18; H01L 31/0232
    USPC .................................. 359/558, 639; 257/432
    See application file for complete search history.

(56) References Cited

U.S. PATENT DOCUMENTS

| | | |
|---|---|---|
| 5,789,264 A | 8/1998 | Chung |
| 8,208,052 B2 | 6/2012 | Hiramoto et al. |
| 8,289,422 B2 | 10/2012 | Hiramoto et al. |
| 8,294,076 B2 | 10/2012 | Nishiwaki et al. |
| 8,384,818 B2 | 2/2013 | Hiramoto et al. |
| 8,514,319 B2 | 8/2013 | Hiramoto et al. |
| 2006/0113901 A1 | 6/2006 | Oh et al. |
| 2011/0025586 A1 | 2/2011 | Lee |
| 2012/0212656 A1 | 8/2012 | Hiramoto et al. |
| 2013/0099343 A1* | 4/2013 | Toshikiyo ......... H01L 27/14625 257/432 |
| 2015/0365640 A1 | 12/2015 | Park et al. |

FOREIGN PATENT DOCUMENTS

| | | |
|---|---|---|
| JP | 3764540 B2 | 4/2006 |
| JP | 2009-244710 A | 10/2009 |

(Continued)

OTHER PUBLICATIONS

W. Groh et al.; "What Is the Lowest Refractive Index of an Organic Polymer?"; Macromolecules; American Chemical Society; vol. 24; No. 25; 1991; pp. 6660-6663.

(Continued)

*Primary Examiner* — William Choi
(74) *Attorney, Agent, or Firm* — Sughrue Mion, PLLC

(57) ABSTRACT

A color splitter, a method of manufacturing the same, and an image sensor including the same are disclosed. The color splitter includes: a color separation element that is formed of a sol-gel material having a high refractive index and exhibits a color separation characteristic; and a low-refractive index layer that has a space in which the color separation element is disposed.

16 Claims, 13 Drawing Sheets

(56) References Cited

FOREIGN PATENT DOCUMENTS

JP          2010-78680 A      4/2010
KR    10-2006-0059604 A      6/2006

OTHER PUBLICATIONS

Jin-gang Liu; "High refractive index polymers: fundamental research and practical applications"; The Royal Society of Chemistry; Journal of Materials Chemistry; vol. 19; 2009; pp. 8907-8919.
Seiji Nishiwaki et al.; "Efficient colour splitters for high-pixel-density image sensors"; Nature Photonics; 2013; pp. 1-7; DOI: 10.1038/NPHOTON.2012.345.
Joseph Lik Hang Chau et al., "Transparent high refractive index nanocomposite thin films", Science Direct, Materials Letters 61, (2007), pp. 2908-2910 (Total 3 pages).

* cited by examiner

COLOR SPLITTER, METHOD OF MANUFACTURING THE SAME, AND IMAGE SENSOR INCLUDING THE SAME

CROSS-REFERENCE TO RELATED APPLICATION

This application claims priority from Korean Patent Application No. 10-2014-0141693, filed on Oct. 20, 2014 in the Korean Intellectual Property Office, the disclosure of which is incorporated herein in its entirety by reference.

BACKGROUND

1. Field

Apparatuses and methods consistent with exemplary embodiments relate to a color splitter, manufacturing the same, and an image sensor including the same.

2. Description of the Related Art

Color display devices or color image sensors use a color filter array to respectively display an image having various colors or sense a color of incident light to generate a signal corresponding to one of three colors in each pixel. Most color display devices and color image sensors being currently used employ a red, green, and blue (RGB) color filter method in which, for example, a green filter is disposed for two of four pixels, and a blue filter and a red filter are respectively disposed for the other two pixels. In addition, besides the RGB color filter method, a cyan, yellow, green, and magenta (CYGM) color filter method in which color filters of cyan, yellow, green magenta having a complementary color relationship therebetween are respectively disposed for four pixels may be employed.

A color filter absorbs light other than corresponded colored light, and thus the light use efficiency of the color filter may be lowered. For example, when an RGB color filter is used, only one-third of incident light is transmitted, and the remaining two-thirds thereof is absorbed and is not used, and thus the light use efficiency of the RGB color filter is merely about 33%. Therefore, for color display devices and color image sensors, most light loss occurs in a color filter.

Recently, a color splitter has been used instead of a color filter to improve the light use efficiency of a color display device or a color image sensor. The color splitter separates colors of incident light by using a diffraction or refraction characteristic of light according to wavelengths and transfers the separated colors to respective corresponding pixels. Therefore, a higher light use efficiency may be achieved when a color splitter is used than when only color filters are used.

SUMMARY

One or more exemplary embodiments provide a color splitter which is easily manufactured and exhibits satisfactory optical performance, a method of manufacturing the same, and an image sensor including the same.

According to an aspect of an exemplary embodiment, there is provided a color splitter including: a color separation element that is formed of a sol-gel material having a high refractive index and exhibits a color separation characteristic; and a low-refractive index layer formed to surround the color separation element.

The color separation element may include a plurality of color separation sub-elements that are spaced apart from one another so as to form a color splitter array.

The color separation element may include a plurality of color separation sub-elements in a multi-stage structure. The plurality of color separation sub-elements are sequentially arranged along a traveling direction of incident light and shifted from one another.

The low-refractive index layer may be formed of a sol-gel material having a lower refractive index than the color separation element.

A difference between the refractive index of the color separation element and the refractive index of the low-refractive index layer may be about 0.7 or more.

At least one of the color separation element and the low-refractive index layer may be formed using a sol-gel material having a transmittance of about 80% or more in a visible region.

The color splitter may further include a light transmitting layer, wherein the low-refractive index layer and the light transmitting layer are formed using a same sol-gel material so as to have a lower refractive index than the color separation element.

According to an aspect of another exemplary embodiment, there is provided an image sensor including: a detection element array including a detection elements that have a two-dimensional pixel arrangement and detect light; and a color splitter array including a plurality of color splitters which are two-dimensionally arranged and separate incident light according to wavelength such that light of different wavelengths is incident to different pixels of the detection element array, wherein the color splitter array includes: a color separation element that is formed of a sol-gel material having a high refractive index and exhibits a color separation characteristic. The color separation element may include a plurality of color separation sub-elements that are spaced apart from one another so as to form an array, and a low-refractive index formed to surround the color separation element.

The color separation element may include the plurality of color separation sub-elements in a multi-stage structure. The plurality of color separation elements are sequentially arranged along a traveling direction of incident light and shifted from one another.

The low-refractive index layer may be formed of a sol-gel material having a lower refractive index than the color separation element.

A difference between the refractive index of the color separation element and the refractive index of the low-refractive index layer may be about 0.7 or more.

At least one of the color separation element and the low-refractive index layer may be formed using a sol-gel material having a transmittance of about 80% or more in a visible region.

The image sensor may further include a light transmitting layer between the color splitter array and the low-refractive index layer, wherein the low-refractive index layer and the light transmitting layer are formed using a same sol-gel material so as to have a lower refractive index than the color separation element.

The image sensor may further include a color filter array in which color filter elements that transmit only light of a specific wavelength band and block light of another wavelength band are arranged in pixel units, between the detection element array and the color splitter array.

According to an aspect of another exemplary embodiment, a method of manufacturing a color splitter includes: forming a color separation element by using a sol-gel material having a high refractive index so as to exhibit a color separation characteristic; and forming a low-refractive index layer formed to surround the color separation element.

The color separation element may include a plurality of color separation sub-elements that are spaced apart from one another so as to form a color splitter array.

The forming of the color separation element and the low-refractive index layer may include: (a) forming and patterning a sacrifice layer; (b) filling the space obtained by patterning the sacrifice layer with a sol-gel material having a first refractive index, curing the sol-gel material, and adjusting a thickness of the cured sol-gel material until a determined height of the cured sol-gel material is achieved; (c) removing the sacrifice layer; and (d) filling a region from which the sacrifice layer has been removed with a sol-gel material having a second refractive index that is different from the first refractive index, curing the sol-gel material having the second refractive index, and adjusting a thickness of the cured sol-gel material until a determined height of the cured sol-gel material is achieved.

The sacrifice layer may be patterned in the space to form the color separation element, the color separation element may be formed of the sol-gel material having the first refractive index, and the low-refractive index layer may be formed of the sol-gel material having the second refractive index.

The sacrifice layer may be patterned in a remaining region other than a region for forming the color separation element, the low-refractive index layer may be formed of the sol-gel material having the first refractive index, and the color separation element may be formed of the sol-gel material having the second refractive index.

Processes (a) and (b) may be repeated two times or more, and while repeating processes (a) and (b), the sacrifice layer may be patterned so as to shift the space obtained by patterning the sacrifice layer, and after repeating processes (a) and (b) two times or more, processes (c) and (d) may be performed to form the color separation element including a plurality of color separation sub-elements in a multi-stage structure. The plurality of color separation sub-elements may be sequentially arranged along a traveling direction of incident light and shifted from one other.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
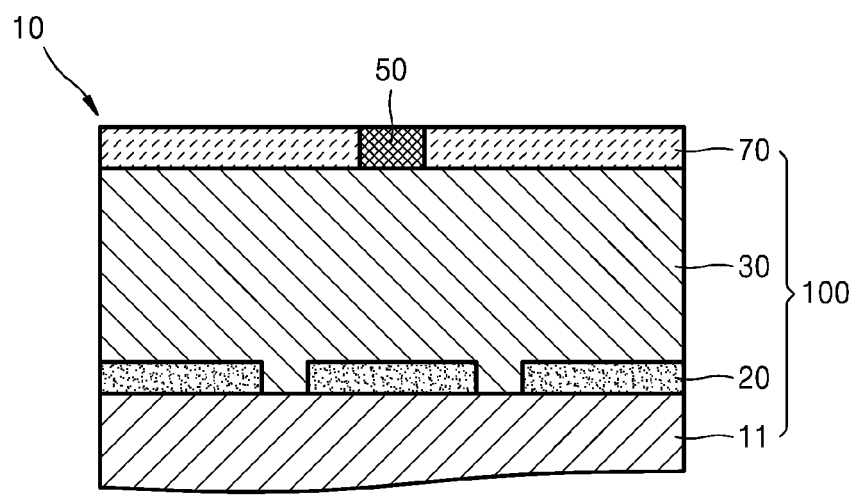
FIG. 1 is a cross-sectional view of a color splitter according to an exemplary embodiment and an image sensor to which the color splitter is implemented.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

With respect to the layer structure of a color splitter to be described below, when it is described that a certain component is above or on another component, the certain component may be directly above or on another component, or a third component may be interposed therebetween.

To form a color splitter, a process of forming a material layer having a relatively low refractive index by a deposition process, depositing a material having a relatively high refractive index on the material layer, etching the material having the relatively high refractive index to remain only a necessary portion, depositing a low-refractive index material layer on the remaining portion and planarizing the low-refractive index material layer may be used. To form layers satisfying necessary optical performance by using the deposition process, deposition conditions are complicated, and a long time is taken for deposition. Specifically, a very long process time and the adjustment of complicated process conditions are needed to exhibit satisfactory optical performance by depositing a material such as titanium oxide ($TiO_2$) having a very high refractive index by a process such as sputtering mainly used for mass production. In addition, a process of patterning a high-refractive material by photolithography or the like and transferring the pattern to the high-refractive material by etching is necessary, and thus, the process is not simple.

According to one or more exemplary embodiments, a color splitter structure in which a low-refractive material wraps around a high-refractive material may be easily manufactured by using a sol-gel material without using a deposition process inside a chamber, such as chemical vapor disposition (CVD), physical vapor disposition (PVD), or the like, and a process of transferring a pattern formed by lithography to a deposited material by dry etching, which have been used in an existing process. According to one or more exemplary embodiments, a color splitter may be manufactured by, for example, a process described below. A sol-gel material is filled in a space, which has been formed by patterning a sacrifice layer by lithography (e.g., spin coating). An upper surface of the sol-gel material is planarized, cured, and etched back such that the cured material remains by a determined height, and the sacrifice layer is removed. An empty space generated by removing the sacrifice layer is filled with a sol-gel material having a different refractive index from that of the previously used sol-gel material by, for example, spin coating, and an upper surface of the sol-gel material having the different refractive index is planarized, cured, and etched back if necessary.

When a space of the sacrifice layer in which a color separation element is to be formed is patterned, the color separation element may be formed in the patterned space by using a high-refractive material, the sacrifice layer may be removed, and a low-refractive index layer may be formed in a region from which the sacrifice layer has been removed.

When a region remaining except for a portion of the sacrifice layer in which a color separation element is to be formed is patterned, a low-refractive index layer may be formed in the patterned space, the sacrifice layer may be removed, and the color separation element may be formed in a region from which the sacrifice layer has been removed, by using a high-refractive material.

The process of forming and patterning a sacrifice layer and forming a color separation element or a low-refractive index layer in a space where the sacrifice layer has been patterned may be repeated two times or more, and since the sacrifice layer is patterned such that the space where the sacrifice layer has been patterned is shifted from each other during the two or more repeated processes, the color separation element may be formed in a multi-stage structure of color separation elements sequentially arranged along a traveling direction of incident light and shifted from each other.

Figure 2:
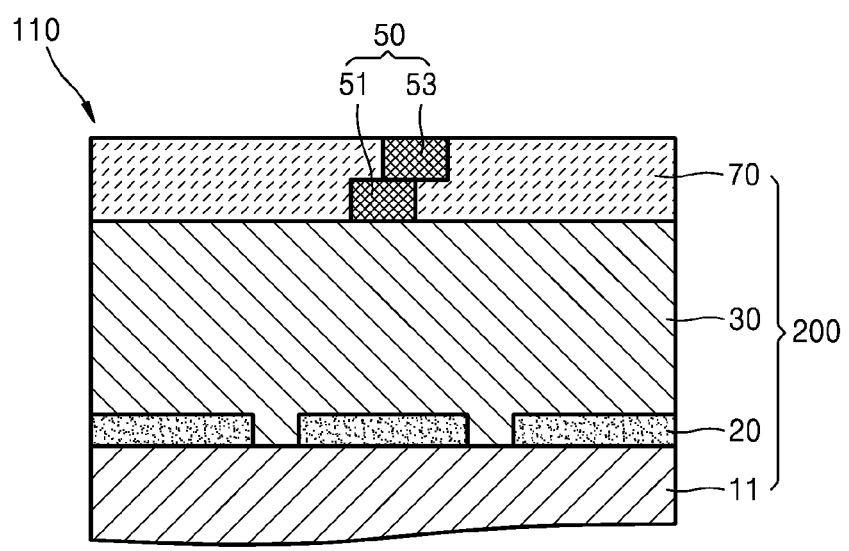
FIG. 2 is a cross-sectional view of a color splitter according to another exemplary embodiment and an image sensor to which the color splitter is implemented.

FIG. 1 is a cross-sectional view of a color splitter 10 according to an exemplary embodiment and an image sensor 100 to which the color splitter 10 is implemented. FIG. 2 is a cross-sectional view of a color splitter 110 according to another exemplary embodiment and an image sensor 200 to which the color splitter 110 is implemented. Although FIGS. 1 and 2 show examples in which the color splitters 10 and 110 according to embodiments are respectively implemented to the image sensors 100 and 200, these are only illustrative. The color splitters 10 and 110 according to exemplary embodiments may be implemented to various optical devices needing a color separation characteristic besides the image sensors 100 and 200.

Referring to FIGS. 1 and 2, the color splitter 10 or 110 includes a color separation element 50 formed into a predetermined shape by using a sol-gel material having a high refractive index so as to exhibit a color separation characteristic and a low-refractive index layer 70 formed to dispose the color separation element 50 therein. When the color splitter 10 or 110 is implemented to the image sensor 100 or 200, the image sensor 100 or 200, as shown in FIGS. 1 and 2, may include a detection element array 11 having a two-dimensional pixel arrangement of detection elements that detect light and a color splitter array in which a plurality of color splitters 10 or 100 that separate incident light according to wavelengths so as for lights of different wavelengths to be incident to different pixels of the detection element array 11 are two-dimensionally arranged. In addition, the image sensor 100 or 200 may further include a color filter array 20 on the detection element array 11. The color filter array 20 may be located between the detection element array 11 and the color splitter array.

When the color splitter 10 or 110 is implemented to the image sensor 100 or 200, the color separation element 50 may be formed plural in number to be spaced from each other so as to form an array, thereby forming a two-dimensional arrangement array of the plurality of color splitters 10 or 100.

The color separation element 50 may be formed of a sol-gel material having a relatively high refractive index. The color separation element 50 may be formed in a simple shape as shown in FIG. 1. Alternatively, the color separation element 50 may be formed in a multi-stage structure of a plurality of color separation sub-elements sequentially arranged along a traveling direction of incident light and shifted from each other as shown in FIG. 2. FIG. 2 shows an example in which the color separation element 50 includes a first color separation element 51 and a second color separation element 53 shifted from each other.

The low-refractive index layer 70 is formed of a material having a lower refractive index than the color separation element 50 and may be formed of, for example, a sol-gel material of a low refractive index.

To exhibit a color separation characteristic, a refractive index difference between the color separation element 50 and the low-refractive index layer 70 may be, for example, about 0.7 or more. As another example, a length of the color separation element 50 may be relatively long enough to exhibit a desired color separation characteristic, and the refractive index difference between the color separation element 50 and the low-refractive index layer 70 may be about 0.7 or less.

A light-transmitting layer 30 may be further provided below the color splitter 10 or 110 to secure necessary arrival distances of lights separated by the color splitter 10 or 110 up to the detection element array 11. The light-transmitting layer 30 may be provided on the detection element array 11, or on the color filter array 20 when the color filter array 20 is provided. The light-transmitting layer 30 may be formed to have a lower refractive index than the color separation element 50. The light-transmitting layer 30 may be formed of a sol-gel material of a low refractive index as well as the low-refractive index layer 70.

The light-transmitting layer 30 may be formed of, for example, the same sol-gel material as the low-refractive index layer 70 so as to have a low refractive index. That is, the light-transmitting layer 30 and the low-refractive index layer 70 may be formed of a same material. In this case, the color separation element 50 having a high refractive index may be disposed in the low-refractive index layer 70 such that the low-refractive index layer 70 is located beside the color separation element 50 and the light-transmitting layer 30 is located at a lower end of the color separation element 50. Although FIGS. 1 and 2 and the drawings to be described below show that the light-transmitting layer 30 and the low-refractive index layer 70 are different layers, the light-transmitting layer 30 and the low-refractive index layer 70 may be formed of a same material and may not be thus discriminated from each other. For example, the light-transmitting layer 30 and the low-refractive index layer 70 may be integrally formed with the same material. According to processes of manufacturing the color splitter 10 or 110, a time of forming the light-transmitting layer 30 may differ from a time of forming the low-refractive index layer 70, and the light-transmitting layer 30 and the low-refractive index layer 70 may be formed as a single layer. Hereinafter, according to circumstances, the low-refractive index layer 70 is used as the meaning including the light-transmitting layer 30, or the light-transmitting layer 30 is used as the meaning including the low-refractive index layer 70.

The light-transmitting layer 30 may be formed of a low refractive index of a different type from the low-refractive index layer 70.

At least one of the color separation element 50 and the low-refractive index layer 70 may be formed using a sol-gel material having a transmittance of about 80% or more in a visible region.

As described above, the color splitter 10 or 110 according to an exemplary embodiment may be formed using, for example, two types or more of sol-gel materials having different refractive indexes. In this case, a sol-gel material having a high refractive index may be formed in a structure of a predetermined shape so as to exhibit a color separation characteristic, and a sol-gel material having a low refractive index may be formed to fill in the surroundings of the sol-gel material having the high refractive index.

For example, for a low-refractive polymer, a refractive index of a cured sol-gel material is about 1.30, and when high-refractive nanoparticles, such as $TiO_2$, are contained, a refractive index of about 2.38 may be obtained. Therefore, when a sol-gel material of a low-refractive polymer is used for the low-refractive index layer 70 and the color separation element 50 is formed using a sol-gel material containing high-refractive nanoparticles, such as $TiO_2$, the color splitter 10 or 110 which exhibits a color separation characteristic by using two types or more of sol-gel materials and has a structure in which the color separation element 50 of a high refractive index is disposed in a hole or space of the low-refractive index layer 70 may be implemented.

When the color splitter 10 or 110 is implemented to the image sensor 100 or 200, the color splitter array may be obtained by forming a plurality of color separation sub-elements 50 on the detection element array 11 to be spaced from each other and to form an array and forming the low-refractive index layer 70 so as to dispose the array of the color separation elements 50 therein.

The detection element array 11 may have a two-dimensional pixel array of detection elements for detecting light.

The color filter array 20 may have color filter elements that transmit only light of a specific wavelength region and block light of the other wavelength regions, which are arranged in pixel units.

The color filter array 20 may include, for example, a plurality of red color filters, a plurality of green color filters, and a plurality of blue color filters. A basic unit of the color filter array 20 may include, for example, four pixels of one red color filter element R, two green color filter elements G, and one blue color filter element B, and the color filter array 20 may be formed in a form in which a plurality of basic units of the four pixels are two-dimensionally arranged. As such, the color filter array 20 may be formed in an RGB color filter method in which four pixels form one basic unit such that one red color filter element R, two green color filter elements G, and one blue color filter element B are respectively disposed on the four pixels. Alternatively, the color filter array 20 may be formed in a CYGM color filter method in which four pixels form one basic unit such that cyan (C), yellow (Y), green (G), and magenta (M) color filter elements having a complementary color relationship are respectively disposed on the four pixels. Besides, the color filter array 20 may be arranged in various ways.

A gap may be formed between the color filter elements of the color filter array 20 to prevent a color crosstalk. A low-refractive material may be filled in the gap between the color filter elements. For example, when the light-transmitting layer 30 is formed of a low-refractive sol-gel material, the gap between the color filter elements may be filled with the material for forming the light-transmitting layer 30. In this case, a process of forming the light-transmitting layer 30 and a gap filling process between the color filter elements may be performed at the same time, and thus, process efficiency may be very improved.

Figure 3A:
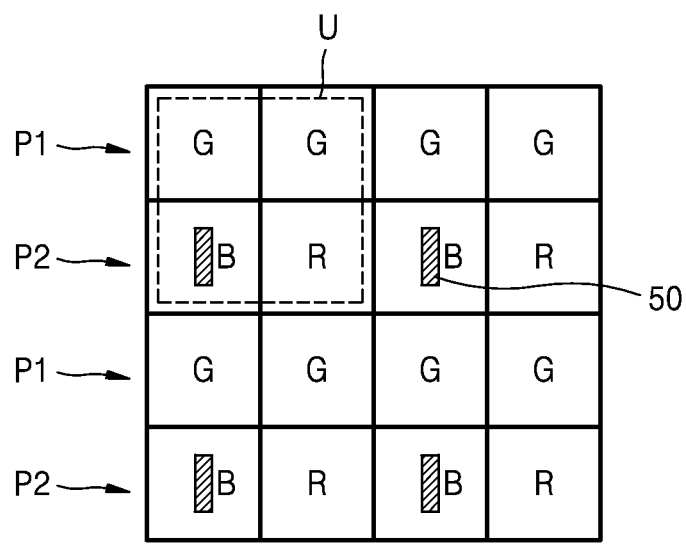
FIG. 3A illustrates a position relationship between color filter elements of a color filter array and color splitters in an image sensor.
Figure 3B:
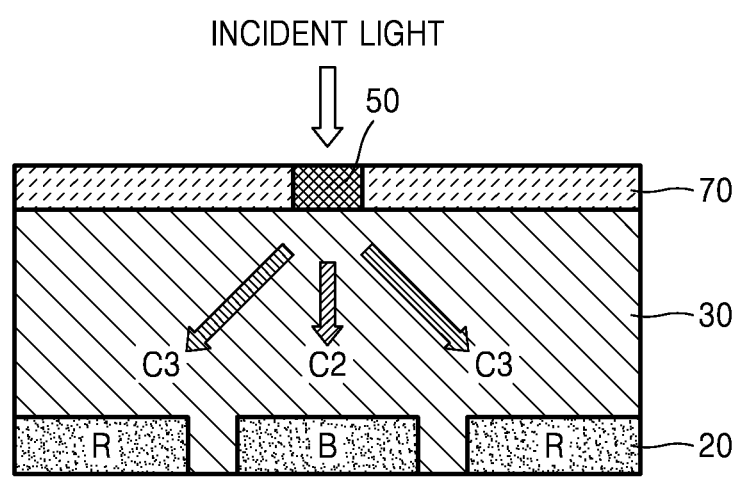
FIG. 3B is an example in which incident light is separated for each color by a color splitter.

FIG. 3A illustrates a position relationship between the color filter elements of the color filter array 20 and the color splitters 10 or 110 in the image sensor 100 or 200. FIG. 3B is an example in which incident light is separated for each color by a color splitter. FIGS. 3A and 3B show that the color separation element 50 has a simple shape as an example.

Referring to FIG. 3A, the color filter array 20 may be provided such that, for example, first color filter elements, e.g., the green color filter elements G, are arranged on a first pixel row P1, second color filter elements and third color filter elements, e.g., the red color filter elements R and the blue color filter elements B, are arranged on a second pixel row P2, and the first pixel row P1 and the second pixel row P2 are alternately located. Herein, the arrangement of the color filter elements of the color filter array 20 may be variously modified.

Each color splitter 10 or 110 of the color splitter array separates incident light according to wavelengths so that lights of different wavelengths are incident to different pixels of the detection element array 11. Herein, a microlens may be further included on the color splitter 10 or 110 so as to condense incident light.

Referring to FIGS. 3A and 3B, the color separation element 50 of the color splitter 10 or 110 may not be disposed on the first pixel row P1 having an arrangement of the green color filter elements G and may be disposed on the second pixel row P2 having an arrangement of the blue color filter elements B and the red color filter elements R so as to separate incident light according to wavelengths, for example, into light C2 mainly including blue light and light C3 mainly including red light. In this case, when the light C2 mainly including blue light passes through a blue color filter element B, only light of a blue wavelength region remains and is detected by a corresponding detection element. When the light C3 mainly including red light passes through a red color filter element R, only light of a red wavelength region remains and is detected by a corresponding detection element. In FIG. 3A, "U" denotes a basic unit of the color filter array 20, which includes four pixels of one red color filter element R, two green color filter elements G, and one blue color filter element B.

When light incident to a region of the first pixel row P1 passes through the green color filter element G, only light of a green wavelength region remains and is detected by a corresponding detection element.

When the position relationship between the color filter elements of the color filter array 20 and the color separation elements 50 of the color splitters 10 or 110 is formed as shown in FIG. 3A, only about one-third of the light incident to the first pixel row P1 passes through the green color filter element G and is detected by a detection element, and blue light and red light of the light incident to the second pixel row P2 are separated by the color splitter 10 and respectively travel towards the blue color filter element B and the red color filter element R, and thus the blue light and the red light respectively pass through the blue color filter element B and the red color filter element R with little loss and are detected by corresponding detection elements.

Therefore, the image sensor 100 or 200 including the color splitter array and the color filter array 20 as described above may have high optical detection efficiency and may also prevent a crosstalk between colors.

Hereinafter, exemplary embodiments of a method of manufacturing the color splitter 10 or 110 will be described with reference to FIGS. 4A to 4F, 5A to 5F, and 6A to 6I. Although processes of manufacturing the color splitter 10 or 110 on a structure including the detection element array 11 and the color filter array 20 of the image sensor 100 or 200 will be described, these are only illustrative. The methods of manufacturing the color splitter 10 or 110, which will be described below, may also be implemented when the color splitter 10 or 110 is manufactured on various optical devices requiring a color separation characteristic besides the image sensors 100 and 200.

A method of manufacturing a color splitter 10 or 110 according to an exemplary embodiment includes forming a color separation element 50 into a predetermined shape by using a sol-gel material having a high refractive index so as to exhibit a color separation characteristic, and forming a low-refractive index layer 70 to dispose the color separation element 50 therein. Here, the low-refractive index layer 70 may be formed after forming the color separation element 50 or the color separation element 50 may be formed after forming the low-refractive index layer 70.

According to a method of manufacturing the color splitter 10 or 110, according to one or more exemplary embodiments, to form the color separation element 50 and the low-refractive index layer 70 that includes a hole or space in which the color separation element 50 is disposed, a sacrifice layer is formed and patterned, a sol-gel material having a first refractive index is filled in a space obtained by patterning the sacrifice layer and is cured, and a thickness of the cured sol-gel material is adjusted until the cured sol-gel material remains by a determined height. Next, the sacrifice layer is removed, a sol-gel material having a second refractive index that is different from the first refractive index is filled in a region from which the sacrifice layer has been removed and is cured, and a thickness of the cured sol-gel material is adjusted until the cured sol-gel material remains by a determined height.

When the color separation element 50 is formed into a simple shape as shown in FIG. 1, the process of forming and patterning the sacrifice layer and filling the sol-gel material having the first refractive index in the space obtained by patterning the sacrifice layer to form a predetermined configuration may be performed only once.

When the color separation element 50 is formed in a multi-stage structure of a plurality of color separation sub-elements sequentially arranged along a traveling direction of incident light and shifted from each other, the process of forming and patterning the sacrifice layer and filling the sol-gel material having the first refractive index in the space obtained by patterning the sacrifice layer to form a predetermined configuration may be repeated two times or more.

FIGS. 4A to 4F illustrate a method of manufacturing the color splitter 10 of FIG. 1, according to an exemplary embodiment.

Figure 4A:
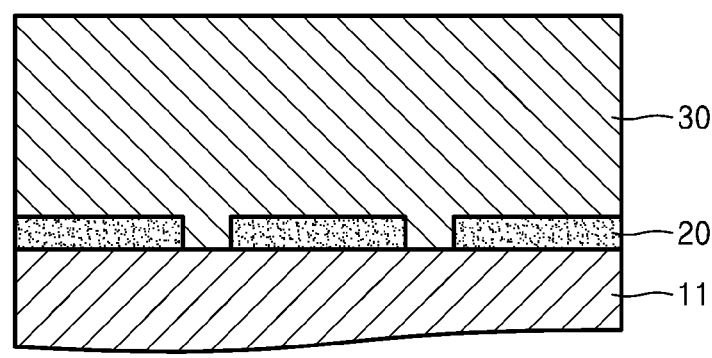
FIGS. 4A to 4F illustrate a method of manufacturing the color splitter of FIG. 1, according to an exemplary embodiment.

Referring to FIG. 4A, a base structure is prepared to manufacture the color splitter 10.

As described above, when the color splitter 10 is implemented to the image sensor 100, the base structure includes the detection element array 11 and may further include the color filter array 20 on the detection element array 11. Hereinafter, a case where the color splitter 10 for the image sensor 100 having the color filter array 20 formed on the detection element array 11 is manufactured will be described as an example.

The base structure may further include the light-transmitting layer 30 on the detection element array 11 or the color filter array 20. The light-transmitting layer 30 may be prepared to secure proper arrival distances of lights separated by the color splitter 10 up to the detection element array 11.

The light-transmitting layer 30 may be formed of a material of a relatively lower refractive index than a material of a high refractive index, which forms the color separation element 50. For example, the light-transmitting layer 30 may be formed by spin-coating a sol-gel material having a relatively low refractive index and curing the spin-coated sol-gel material by a baking process. Alternatively, the light-transmitting layer 30 may be formed by depositing a material having a relatively low refractive index.

When a gap is formed between color filter elements and is filled with a low-refractive material to prevent a color crosstalk in a structure using the color filter array 20, while performing the process of forming the light-transmitting layer 30 by using a sol-gel material having a relatively low refractive index, the gap between color filter elements may also be filled with the sol-gel material. That is, the process of forming the light-transmitting layer 30 and the process of filling the gap between color filter elements may be performed at the same time.

For a structure in which the color filter array 20 is not included, the light-transmitting layer 30 may be formed on the detection element array 11.

Figure 4B:
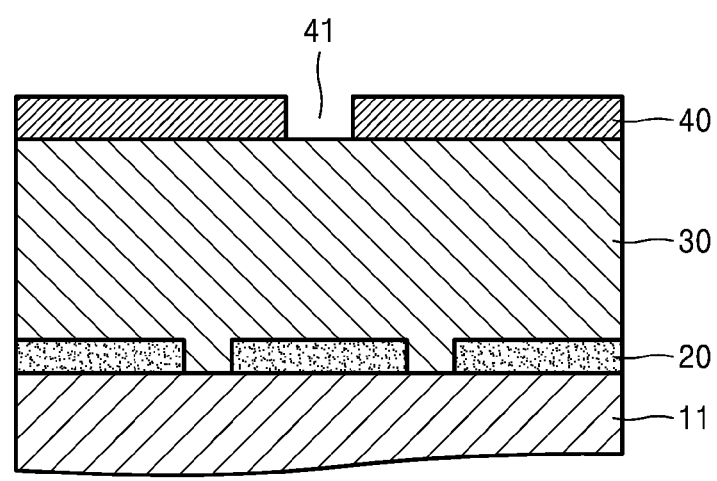

After forming the light-transmitting layer 30 as described above, a sacrifice layer 40 is formed on the light-transmitting layer 30 and is patterned as shown in FIG. 4B. In the present exemplary embodiment, the sacrifice layer 40 may be patterned to form a space 41 in which the color separation element 50 is to be formed. For example, the sacrifice layer 40 may be stacked by a thickness of the color separation element 50 or more and patterned up to a depth at which the light-transmitting layer 30 appears such that a space in which a material having a relatively high refractive index is filled is provided.

The sacrifice layer 40 may be easily removed by a wet or dry etching process and may be formed of a material capable of being patterned. For example, the sacrifice layer 40 may be formed of a photoresistor or the like and may be patterned by a photolithography process.

Figure 4C:
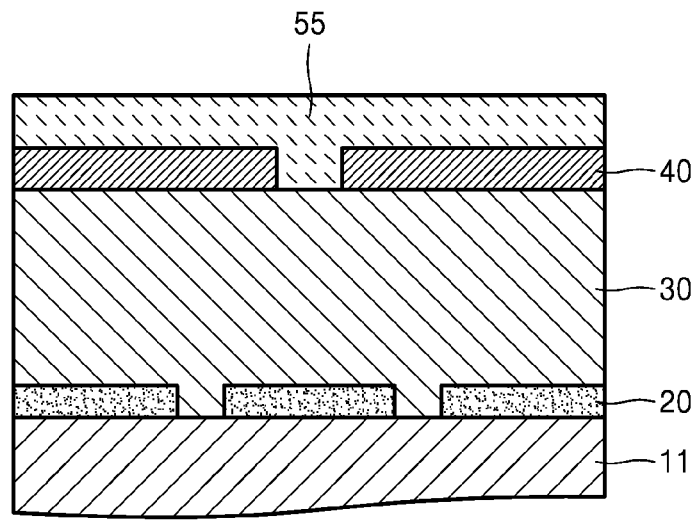
Figure 4D:
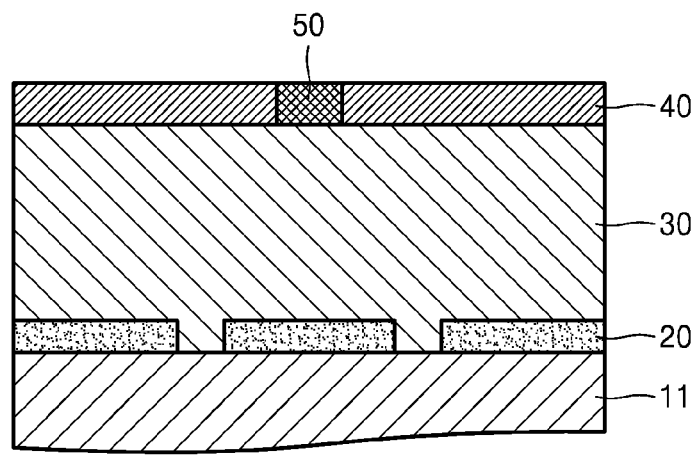

Next, referring to FIGS. 4C and 4D, after a sol-gel material having the first refractive index is filled in the space 41 obtained by patterning the sacrifice layer 40 and is cured, a thickness of the cured sol-gel material may be adjusted until the cured sol-gel material remains by a determined height.

As shown in FIG. 4C, when the space 41 is obtained by patterning a portion of the sacrifice layer 40 that corresponds to a location at which the color separation element 50 is to be formed, a high-refractive sol-gel material for forming the color separation element 50 may be used as the sol-gel material having the first refractive index.

As such, a high-refractive sol-gel material layer 55 may be formed by, for example, spin-coating a sol-gel material having a relatively high refractive index on the sacrifice layer 40 having a pattern to fully fill the patterned space 41 with a high-refractive material and coating the high-refractive material by a sufficient height so as to have a planarized upper surface. Thereafter, the high-refractive sol-gel material layer 55 may be cured by baking.

Next, as shown in FIG. 4D, the color separation element 50 may be formed in the patterned space 41 of the sacrifice layer 40 by etching back the high-refractive sol-gel material layer 55 by using dry etching equipment, or polishing by using a polishing process, e.g., a chemical mechanical polishing (CMP) process to reduce the thickness of the high-refractive sol-gel material layer 55 and planarize the high-refractive sol-gel material layer 55 until the high-refractive sol-gel material layer 55 remains by a determined height.

Figure 4E:
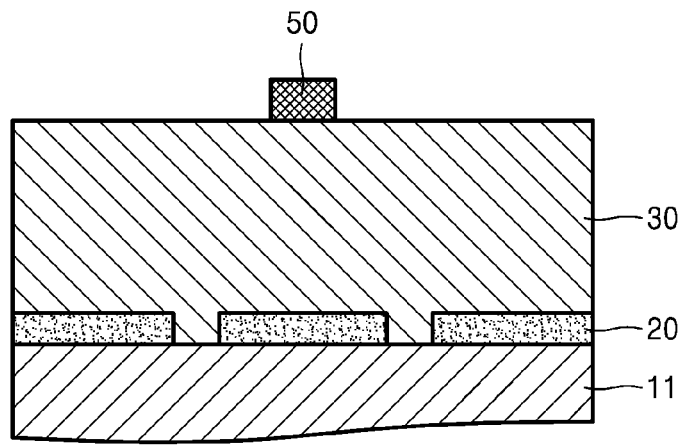

Next, as shown in FIG. 4E, the sacrifice layer 40 may be removed by, for example, a wet or dry etching process.

Figure 4F:
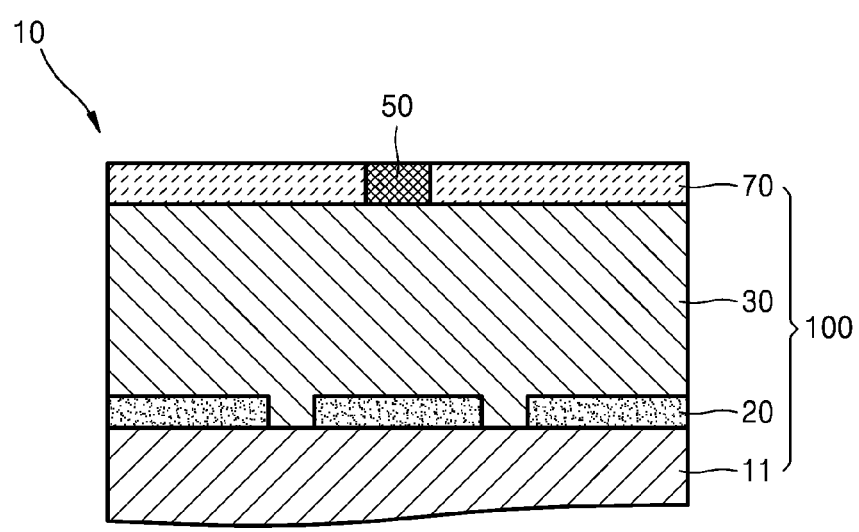

Next, as shown in FIG. 4F, after a sol-gel material having the second refractive index that is different from the first refractive index is filled in a region from which the sacrifice layer 40 has been removed and is cured, a thickness of the cured sol-gel material may be adjusted until the cured sol-gel material remains by a determined height.

When the color separation element 50 is formed using a high-refractive sol-gel material in the space 41 obtained by patterning the sacrifice layer 40, a low-refractive sol-gel material forming the low-refractive index layer 70 may be used as the sol-gel material having the second refractive index.

For example, the low-refractive index layer 70 that disposes the color separation element 50 therein may be formed by coating, by for example spin coating, a sol-gel material having a relatively low refractive index on a region from which the sacrifice layer 40 has been removed, curing the coated sol-gel material by baking, and thinning and planarizing the cured sol-gel material by an etchback or polishing, e.g., CMP, process until the color separation element 50 of a high-refractive material is revealed.

If a low-refractive material is deposited, a deposited surface is formed as a severely uneven surface according to the shape of the protruding color separation element 50, and thus the surface may be planarized only by a precise CMP process. However, the sol-gel material may be formed with a planarized surface by spin coating, and thus, not only the CMP process but also an etchback process by dry etching may be selectively used.

According to the method of manufacturing the color splitter 10, according to the exemplary embodiment described above, since a layer forming and patterned space filling process using a simple sol-gel method is used instead of patterning a high-refractive material by precise etching after an in-chamber deposition process, such as CVD, PVD, or the like, and a pattern masking process by lithography for patterning the high-refractive material, the color splitter 10 may be manufactured using very simple equipment and an easy process.

In addition, when a gap between color filter elements is formed and filled with a low-refractive material to prevent a color crosstalk in a structure using the color filter array 20, the process of forming the light-transmitting layer 30 and the process of filling the gap with the low-refractive material may be performed at the same time, and thus, process efficiency may be improved.

In addition, when an end point detector (EPD) is used to detect an accurate etchback end point in an etchback process, the sacrifice layer 40 having a wide area appears at a location where etchback of the high-refractive material is supposed to end, and thus, the etchback end point may be accurately detected.

FIGS. 5A to 5F illustrate a method of manufacturing the color splitter 10 of FIG. 1, according to another exemplary embodiment.

Figure 5A:
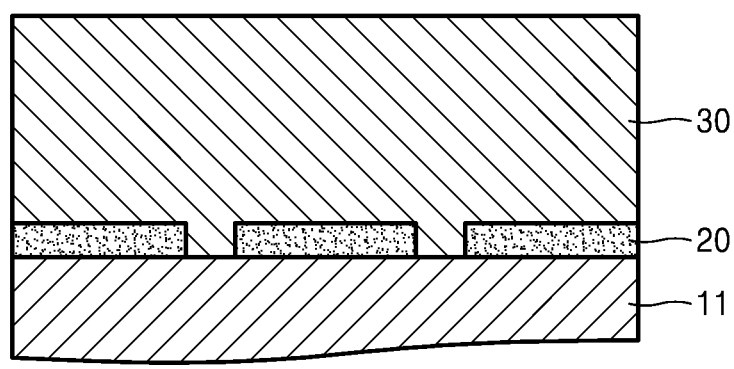
FIGS. 5A to 5F illustrate a method of manufacturing the color splitter of FIG. 1, according to another exemplary embodiment.

Referring to FIG. 5A, a base structure is prepared to manufacture the color splitter 10. The base structure may include the detection element array 11, the color filter array 20, the light-transmitting layer 30, and the like. A process of forming the light-transmitting layer 30 is the same as described above with reference to FIG. 4A, and thus, the description thereof is not repeated herein.

Figure 5B:
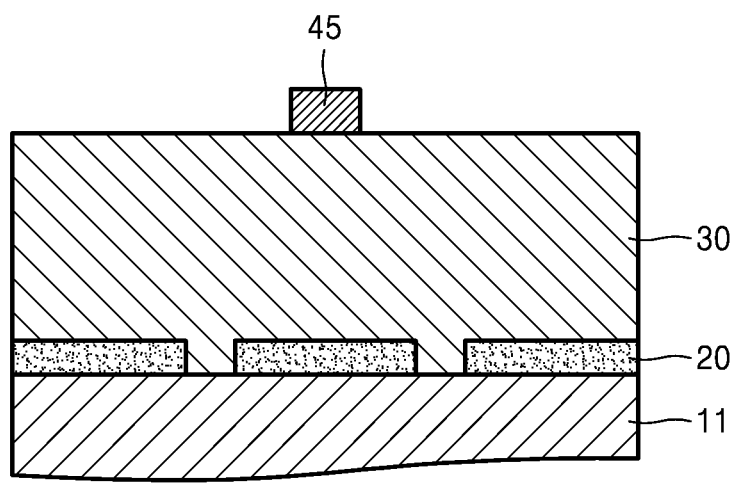

After forming the light-transmitting layer 30 as described above, a sacrifice layer is formed on the light-transmitting layer 30 and is patterned as shown in FIG. 5B. In this case, the sacrifice layer may be patterned in a region remaining except for a portion 45 where the color separation element 50 is to be formed. The sacrifice layer may be stacked by a thickness of the color separation element 50 or more, and the other sacrifice region except for the portion 45 where the color separation element 50 is to be formed may be removed until the light-transmitting layer 30 appears.

The sacrifice layer may be easily removed by a wet or dry etching process and may be formed of a material capable of being patterned. For example, the sacrifice layer may be formed of a photoresistor or the like and may be patterned by a photolithography process.

Figure 5C:
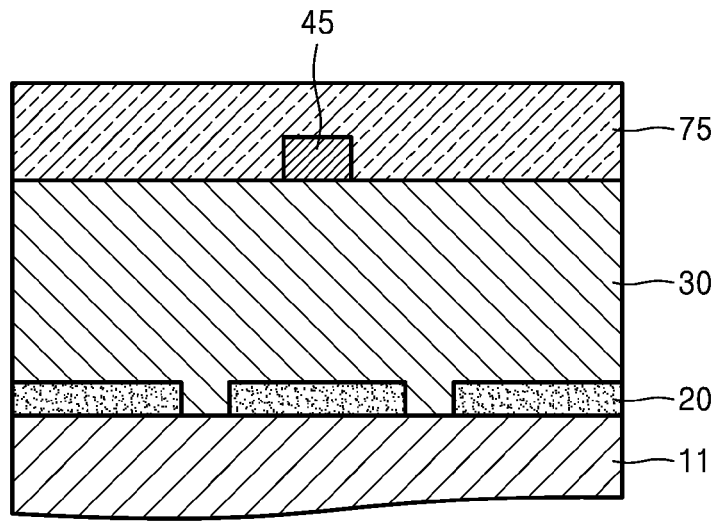
Figure 5D:
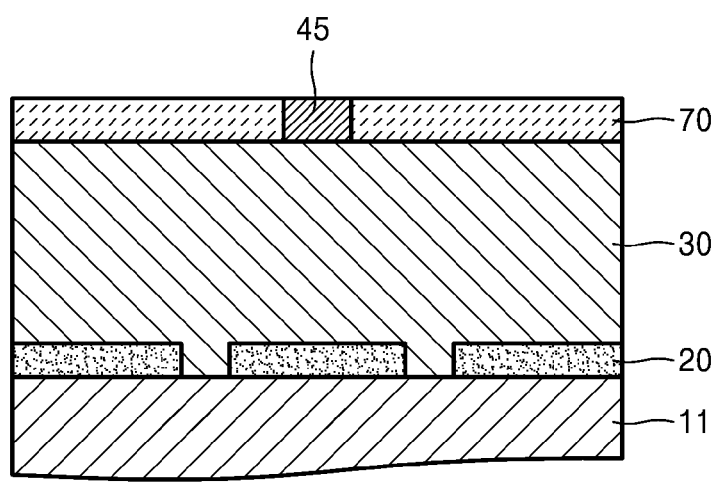

Next, referring to FIGS. 5C and 5D, after a sol-gel material having the first refractive index is filled in the space obtained by patterning the sacrifice layer and is cured, a thickness of the cured sol-gel material may be adjusted until the cured sol-gel material remains by a determined height.

As shown in FIG. 5C, when the space obtained by patterning the sacrifice layer corresponds to the region remaining except for the portion 45 where the color separation element 50 is to be formed, a low-refractive sol-gel material for forming the low-refractive index layer 70 in which the color separation element 50 is disposed may be used as the sol-gel material having the first refractive index.

As such, a low-refractive sol-gel material layer 75 is formed by, for example, spin-coating a sol-gel material having a relatively low refractive index on the sacrifice layer having a pattern to fully fill the patterned space with a low-refractive material and coating the low-refractive material by a sufficient height so as to have a planarized upper surface. Thereafter, the low-refractive sol-gel material layer 75 is cured by baking.

Next, as shown in FIG. 5D, the low-refractive index layer 70 is formed in the patterned space of the sacrifice layer by etching back the low-refractive sol-gel material layer 75 by using dry etching equipment, or polishing by using a polishing process, e.g., a CMP process to reduce the thickness of the low-refractive sol-gel material layer 75 and planarize the low-refractive sol-gel material layer 75 until the low-refractive sol-gel material layer 75 remains by a determined height by using a polishing process, e.g., a CMP process.

Figure 5E:
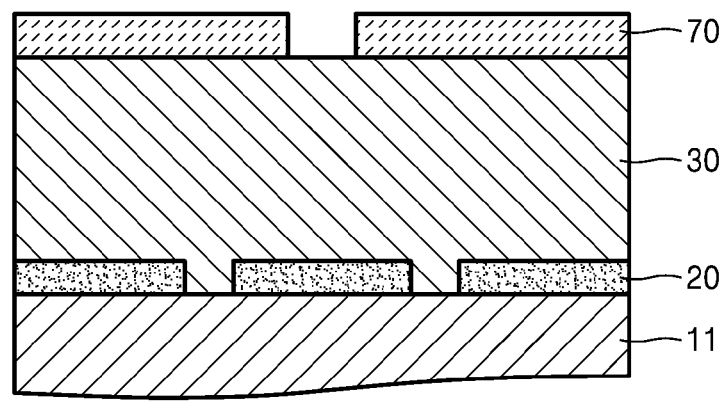

Next, as shown in FIG. 5E, the sacrifice layer which remains in the portion 45 where the color separation element 50 is to be formed is removed by, for example, a wet or dry etching process.

Figure 5F:
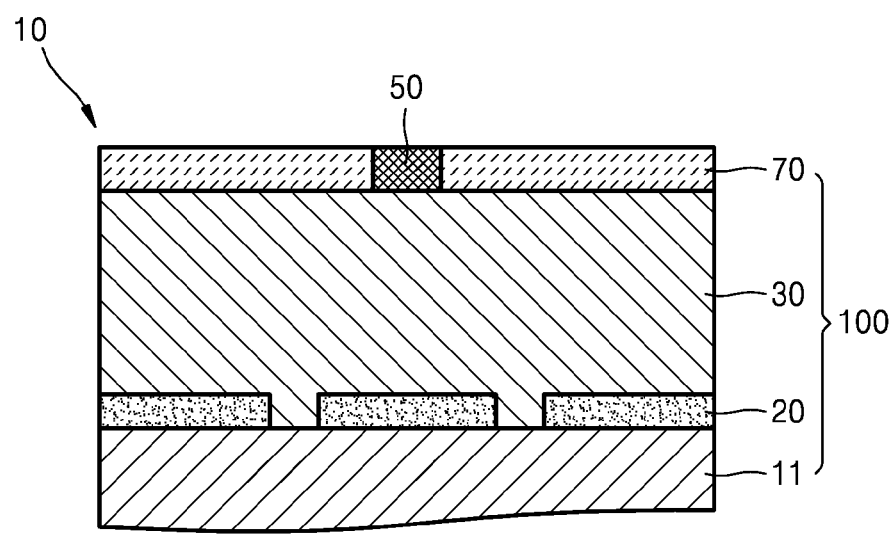

Next, as shown in FIG. 5F, after a sol-gel material having the second refractive index that is different from the first refractive index is filled in the space from which the remaining sacrifice layer has been removed and is cured, a thickness of the cured sol-gel material is adjusted until the cured sol-gel material remains by a determined height.

Herein, a high-refractive sol-gel material forming the color separation element 50 may be used as the sol-gel material having the second refractive index, which is filled in the space from which the remaining sacrifice layer has been removed.

For example, the color separation element 50 may be placed in the low-refractive index layer 70 by coating, by for example spin coating, a sol-gel material having a relatively high refractive index on the space from which the remaining sacrifice layer has been removed, curing the coated sol-gel material by baking, and thinning and planarizing the cured sol-gel material by an etchback or polishing, e.g., CMP, process until the low-refractive index layer 70 is revealed.

If a high-refractive material is deposited, a deposited surface is formed as an uneven surface according to the shape of the low-refractive index layer 70 surrounding the space from which the remaining sacrifice layer has been removed, and thus the surface may be planarized only by a precise CMP process. However, the sol-gel material may be formed with a planarized surface by spin coating, and thus, not only the CMP process but also an etchback process by dry etching may be selectively used.

According to the method of manufacturing the color splitter 10, according to another exemplary embodiment described above, as well as the previous exemplary embodiment, the color splitter 10 may be manufactured using very simple equipment and an easy process. In addition, when a gap between color filter elements is formed and filled with a low-refractive material to prevent a color crosstalk in a structure using the color filter array 20, the process of forming the light-transmitting layer 30 and the process of filling the gap between color filter elements may be performed at the same time, and thus, process efficiency may be improved. In addition, when an EPD is used to detect an accurate etchback end point in an etchback process, the low-refractive index layer 70 having a wide area appears at a location where etchback of the high-refractive material is supposed to end, and thus, the etchback end point may be accurately detected.

FIGS. 6A to 6I illustrate a method of manufacturing the color splitter 10 of FIG. 2, according to an exemplary embodiment.

Figure 6A:
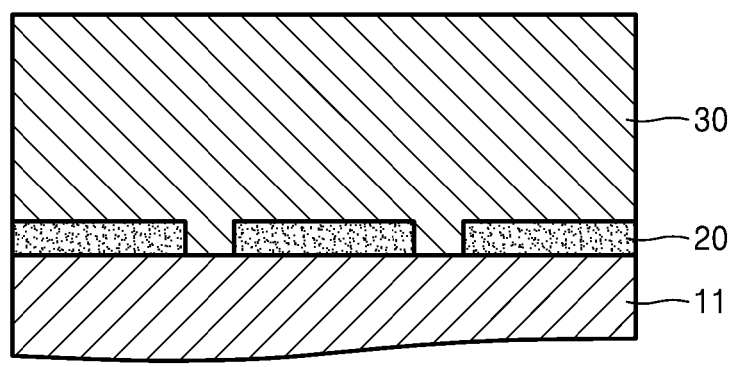
FIGS. 6A to 6I illustrate a method of manufacturing the color splitter of FIG. 2, according to an exemplary embodiment.

Referring to FIG. 6A, a base structure is prepared to manufacture the color splitter 110. The base structure may include the detection element array 11, the color filter array 20, the light-transmitting layer 30, and the like. A process of forming the light-transmitting layer 30 is the same as described above with reference to FIG. 4A, and thus, the description thereof is not repeated herein.

Figure 6B:
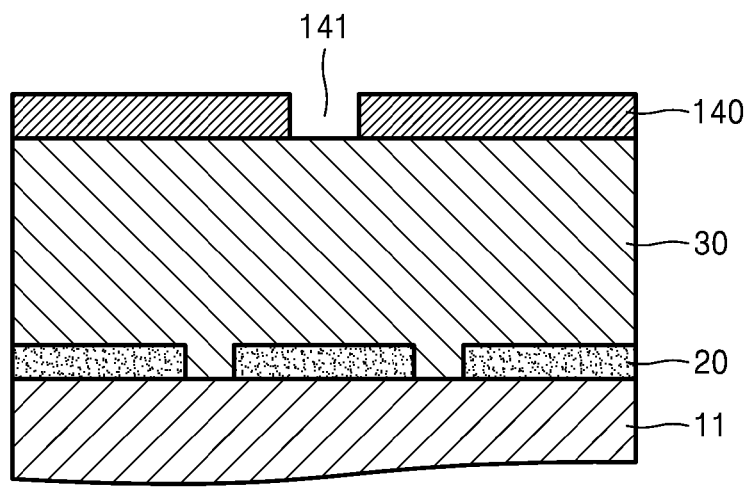

After forming the light-transmitting layer 30 as described above, a sacrifice layer 140 is formed on the light-transmitting layer 30 and is patterned as shown in FIG. 6B. In this case, the sacrifice layer 140 is patterned to form a space 141 in which the first color separation element 51 of the color separation element 50 is to be formed. For example, the sacrifice layer 140 is stacked by a thickness of the first color separation element 51 or more and patterned up to a depth at which the light-transmitting layer 30 appears such that a space 141 in which a material having a relatively high refractive index is filled is provided.

The sacrifice layer 140 may be easily removed by a wet or dry etching process and may be formed of a material capable of being patterned. For example, the sacrifice layer 140 may be formed of a photoresistor or the like and may be patterned by a photolithography process.

Figure 6C:
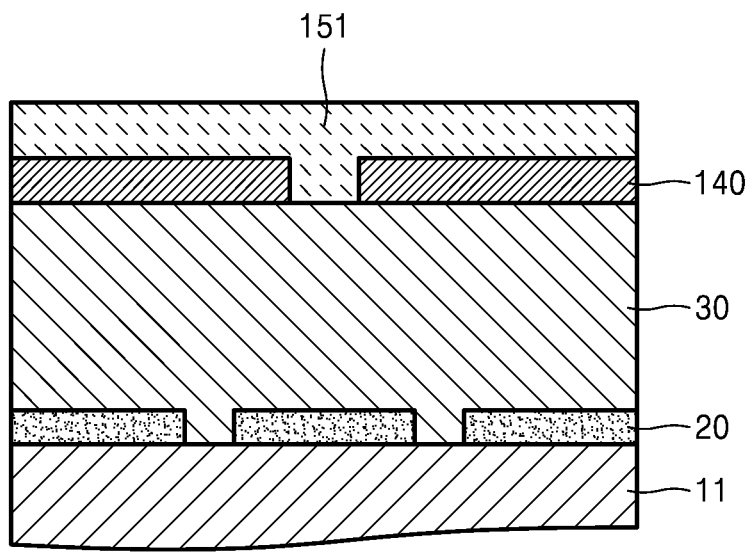
Figure 6D:
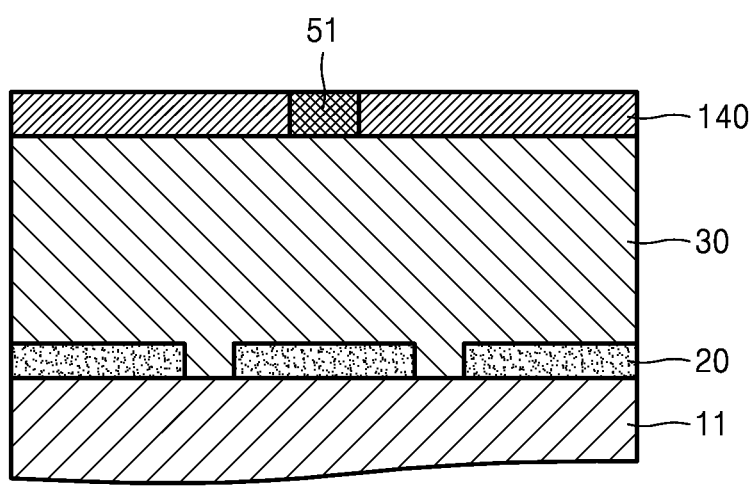

Next, referring to FIGS. 6C and 6D, after a sol-gel material having the first refractive index is filled in the space 141 obtained by patterning the sacrifice layer 140 and is cured, a thickness of the cured sol-gel material may be adjusted until the cured sol-gel material remains by a determined height.

As shown in FIG. 6C, when the space 141 obtained by patterning the sacrifice layer 140 corresponds to a location at which the first color separation element 51 is to be formed, a high-refractive sol-gel material for forming the color separation element 50 may be used as the sol-gel material having the first refractive index.

As such, a high-refractive sol-gel material layer 151 is formed by, for example, spin-coating a sol-gel material having a relatively high refractive index on the sacrifice layer 140 having a pattern to fully fill the patterned space 141 with a high-refractive material and coating the high-refractive material by a sufficient height so as to have a planarized upper surface. Thereafter, the high-refractive sol-gel material layer 151 is cured by baking.

Next, as shown in FIG. 6D, the first color separation element 51 is formed in the patterned space 141 of the sacrifice layer 140 by etching back the high-refractive sol-gel material layer 151 by using dry etching equipment, or polishing by using a polishing process, e.g., a CMP process to reduce the thickness of the high-refractive sol-gel material layer 151 and planarize the high-refractive sol-gel material layer 151 until the high-refractive sol-gel material layer 151 remains by a determined height.

Figure 6E:
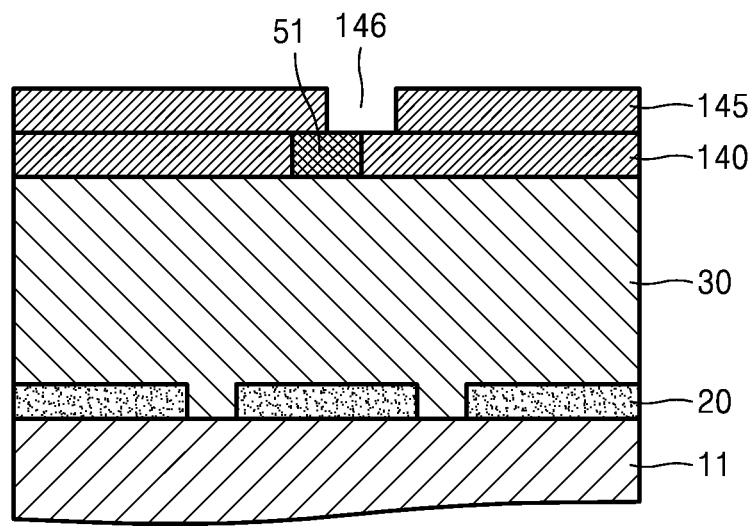

Next, another sacrifice layer 145 is formed on the sacrifice layer 140 and the first color separation element 51 and is patterned as shown in FIG. 6E. In this case, the sacrifice layer 145 is patterned to form a space 146 in which the second color separation element 53 is to be formed such that the second color separation element 53 is shifted from the first color separation element 51 of the color separation element 50. The first color separation element 51 may be partially exposed through the space 146. For example, the sacrifice layer 145 is stacked by a thickness of the second color separation element 53 or more and patterned up to, for example, a depth at which the first color separation element 51 appears such that a space 146 in which a material having a relatively high refractive index is filled again is provided. Although FIGS. 6E to 6G show for convenience that the whole sacrifice layer is divided into the sacrifice layer 140 and the sacrifice layer 145, the sacrifice layer 140 and the sacrifice layer 145 may not be discriminated from each other.

Figure 6F:
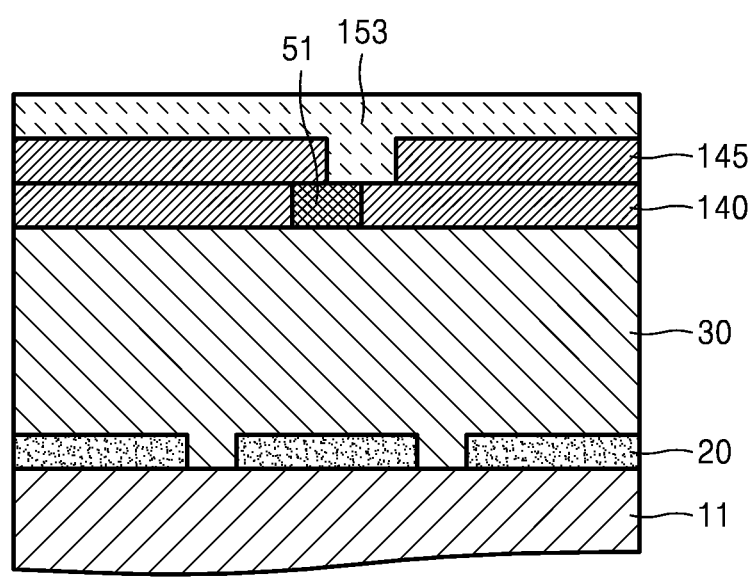
Figure 6G:
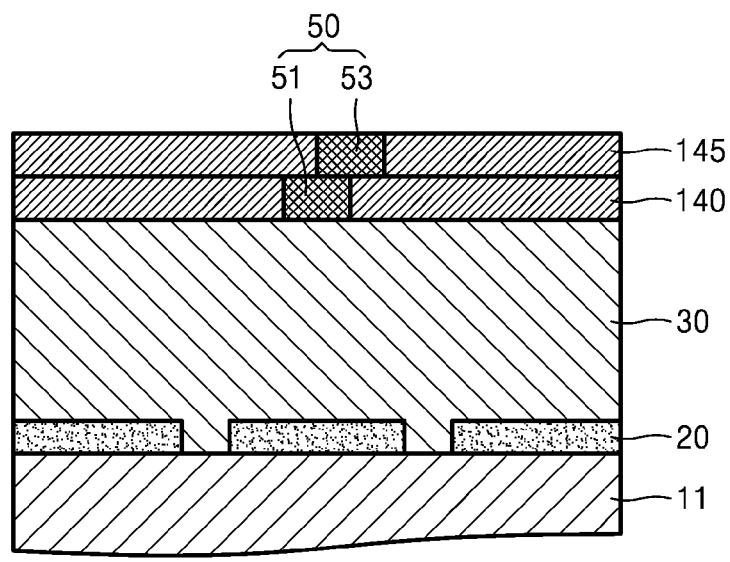

Next, referring to FIGS. 6F and 6G, after a sol-gel material having the first refractive index is filled in the space 146 obtained by patterning the sacrifice layer 145 and is cured, a thickness of the cured sol-gel material may be adjusted until the cured sol-gel material remains by a determined height.

As shown in FIG. 6F, when the space 146 obtained by patterning the sacrifice layer 145 corresponds to a location at which the second color separation element 53 is to be formed, a high-refractive sol-gel material for forming the color separation element 50 may be used as the sol-gel material having the first refractive index.

As such, a high-refractive sol-gel material layer 153 is formed by, for example, spin-coating a sol-gel material having a relatively high refractive index on the sacrifice layer 145 having a pattern to fully fill the patterned space 146 with a high-refractive material and coating the high-refractive material by a sufficient height so as to have a planarized upper surface. Thereafter, the high-refractive sol-gel material layer 153 is cured by baking.

Next, as shown in FIG. 6G, the second color separation element 53 is formed in the patterned space 146 of the sacrifice layer 145 by etching back the high-refractive sol-gel material layer 153 by using dry etching equipment, or polishing by using a polishing process, e.g., a CMP process to reduce the thickness of the high-refractive sol-gel material layer 153 and planarize the high-refractive sol-gel material layer 153 until the high-refractive sol-gel material layer 153 remains by a determined height.

By repeating the operations described above, the color separation element 50 having a multi-stage structure of a plurality of color separation sub-elements sequentially arranged along a traveling direction of incident light and shifted from each other may be formed.

Figure 6H:
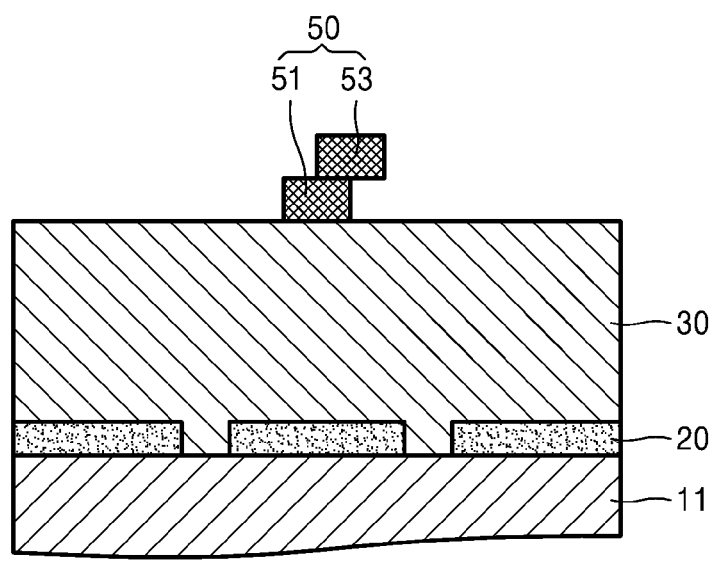

Next, as shown in FIG. 6H, the sacrifice layers 140 and 145 are removed by, for example, a wet or dry etching process.

Figure 6I:
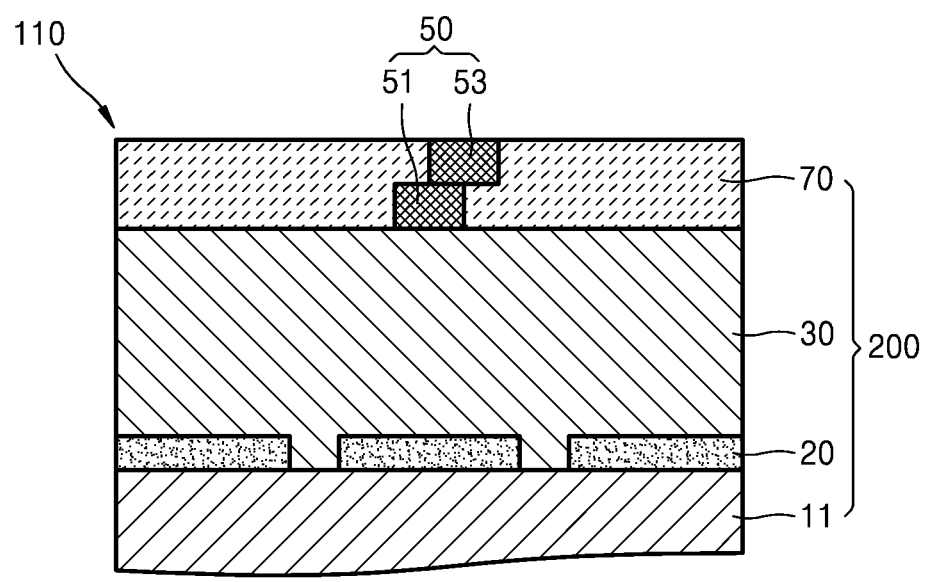

Next, as shown in FIG. 6I, after a sol-gel material having the second refractive index that is different from the first refractive index is filled in a region from which the sacrifice layers 140 and 145 have been removed and is cured, a thickness of the cured sol-gel material is adjusted until the cured sol-gel material remains by a determined height.

When the color separation element 50 having a multi-stage structure is formed using a high-refractive sol-gel material in the spaces 141 and 146 obtained by patterning the sacrifice layers 140 and 145, a low-refractive sol-gel material forming the low-refractive index layer 70 may be used as the sol-gel material having the second refractive index.

For example, the low-refractive index layer 70 that disposes the color separation element 50 therein may be formed by coating, by for example spin coating, a sol-gel material having a relatively low refractive index on a region from which the sacrifice layers 140 and 145 have been removed, curing the coated sol-gel material by baking, and thinning and planarizing the cured sol-gel material by an etchback or polishing, e.g., CMP, process until the color separation element 50 of a multi-stage structure formed of a high-refractive material is revealed. Accordingly, the color splitter 110 having a multi-stage structure of a plurality of color separation sub-elements sequentially arranged along a traveling direction of incident light and shifted from each other in a form buried in the low-refractive index layer 70 may be obtained.

If a low-refractive material is deposited, a deposited surface is formed as a severely uneven surface according to the shape of the protruding color separation element 50, and thus the surface may be planarized only by a precise CMP process. However, the sol-gel material may be formed with a planarized surface by spin coating, and thus, not only the CMP process but also an etchback process by dry etching may be selectively used.

FIGS. 6A to 6I show a manufacturing method when the color separation element 50 includes the first and second color separation elements 51 and 53 shifted from each other, and if the processes in FIGS. 6E to 6G are repeated, the color splitter 110 including the color separation element 50 having color separation elements of three stages or more, which are shifted from each other, may be formed. The upper surface of the first color separation element 51 may partially be in contact with the lower surface of the second color separation element 53.

In addition, although FIGS. 6A to 6I show a case of forming the sacrifice layers 140 and 145, patterning the sacrifice layers 140 and 145 to form a space in which the color separation element 50 is to be formed, and forming the color separation element 50 in the space, in order to form a multi-stage structure of the color separation element 50, as well as the exemplary embodiment described with reference to FIGS. 4A to 4F, this is only illustrative. Even when the color splitter 110 having a multi-stage structure of the color separation element 50 is manufactured, the color splitter 110 may be manufactured by applying the same processes as the exemplary embodiment described with reference to FIGS. 5A to 5F. For example, the sacrifice layer 140 is patterned in a region remaining except for a portion where a color separation element of one stage, e.g., the first color separation element 51, is to be formed, and the low-refractive index layer 70 is formed in the patterned region. The sacrifice layer 145 is formed again on the low-refractive index layer 70 and is patterned in a region remaining except for a portion where a color separation element of one stage, e.g., a color separation element of a next stage, which is shifted from the first color separation element 51, e.g., the second color separation element 53, is to be formed, and the low-refractive index layer 70 is formed in the patterned region by adding an additional thickness. By repeating the above-described operations, a structure in which sacrifice layers remain only a portion corresponding to a multi-stage structure of the color separation element 50 including a plurality of color separation sub-elements shifted from each other and the low-refractive index layer 70 is formed around the remaining sacrifice layers is formed, the remaining sacrifice layers are removed, and a high-refractive material layer is formed by filling a high-refractive sol-gel material in the portion from which the remaining sacrifice layers have been removed and is cured. Thereafter, by etching or polishing the high-refractive material layer until the high-refractive material layer becomes a desired thickness, the multi-stage structure of the plurality of color separation sub-elements sequentially arranged along a traveling direction of incident light and shifted from each other may be obtained in a form buried in the low-refractive index material 70.

According to the method of manufacturing the color splitter 110, which has been described with reference to FIGS. 6A to 6I, since a layer forming and patterned space filling process using a simple sol-gel method is also used instead of patterning a high-refractive material by precise etching after an in-chamber deposition process, such as CVD, PVD, or the like, and a pattern masking process by lithography for patterning the high-refractive material, the color splitter 110 may be manufactured using very simple equipment and an easy process. In addition, when a gap between color filter elements is formed and filled with a low-refractive material to prevent a color crosstalk in a structure using the color filter array 20, the process of forming the light-transmitting layer 30 and the process of filling the gap with the low-refractive material may be performed at the same time, and thus, process efficiency may be improved.

According to the color splitters 10 and 110 and the methods of manufacturing the same, according to the exemplary embodiments described above, although not only the color separation element 50 but also the low-refractive index layer 70 are formed using a sol-gel material, only the color separation element 50 may be formed using a high-refractive sol-gel material, and the low-refractive index layer 70 may be formed by a deposition process.

As described above, according to a color splitter according to the one or more of the above exemplary embodiments, a color separation element disposed in a hole or space of a low-refractive index layer may be formed into a predetermined shape by using a sol-gel material having a high refractive index so as to exhibit a color separation characteristic. In addition, the color splitter according to the one or more of the above exemplary embodiments may be formed using two or more types of sol-gel materials having different refractive indexes.

The color splitter may be easily manufactured and exhibit satisfactory optical performance.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art

What is claimed is:
1. A color splitter comprising:
   a color separation element that is formed of a sol-gel material having a higher refractive index and exhibits a color separation characteristic; and a lower refractive index layer formed to surround the color separation element, further comprising:
a light transmitting layer,
wherein the lower refractive index layer and the light transmitting layer are formed using a same sol-gel material that has a refractive index lower than a refractive index of the color separation element.

2. The color splitter of claim 1, wherein the color separation element comprises a plurality of color separation sub-elements that are spaced apart from one another so as to form a color splitter array.

3. The color splitter of claim 1, wherein the color separation element comprises a plurality of color separation sub-elements in a multi-stage structure, the plurality of color separation sub-elements being sequentially arranged along a traveling direction of incident light and shifted from one another.

4. The color splitter of claim 1, wherein a difference between the refractive index of the color separation element and the refractive index of the lower refractive index layer is about 0.7 or more.

5. The color splitter of claim 1, wherein at least one of the color separation element and the lower refractive index layer is formed using a sol-gel material having a transmittance of about 80% or more in a visible region.

6. An image sensor comprising:
a detection element array comprising a detection elements that have a two-dimensional pixel arrangement and detect incident light; and
a color splitter array comprising a plurality of color splitters which are two-dimensionally arranged and separate incident light according to wavelengths such that light of different wavelengths is incident to different pixels of the detection element array,
wherein the color splitter array comprises:
a color separation element that is formed of a sol-gel material having a higher refractive index and exhibits a color separation characteristic, the color separation element comprising a plurality of color separation sub-elements that are spaced apart from one another so as to form an array; and
a lower refractive index layer formed to surround the color separation element, further comprising a light transmitting layer between the color splitter array and the lower refractive index layer,
wherein the lower refractive index layer and the light transmitting layer are formed using a same sol-gel material that has a refractive index lower than a refractive index of the color separation element.

7. The image sensor of claim 6, wherein the color separation element comprises the plurality of color separation sub-elements in a multi-stage structure, and the plurality of color separation sub-elements are sequentially arranged along a traveling direction of incident light and shifted from one another.

8. The image sensor of claim 6, wherein a difference between the refractive index of the color separation element and the refractive index of the lower refractive index layer is about 0.7 or more.

9. The image sensor of claim 6, wherein at least one of the color separation element and the lower refractive index layer is formed using a sol-gel material having a transmittance of about 80% or more in a visible region.

10. The image sensor of claim 6, further comprising a color filter array in which color filter elements that transmit only light of a specific wavelength band and block light of another wavelength band are arranged, in pixel units, between the detection element array and the color splitter array.

11. A method of manufacturing a color splitter, the method comprising:
forming a color separation element by using a sol-gel material having a higher refractive index so as to exhibit a color separation characteristic; and
forming a lower refractive index layer formed to surround the color separation element.

12. The method of claim 11, wherein the color separation element comprises a plurality of color separation sub-elements that are spaced apart from one another so as to form a color splitter array.

13. The method of claim 11, wherein the forming the color separation element and the lower refractive index layer comprises:
(a) forming and patterning a sacrifice layer;
(b) filling the space obtained by patterning the sacrifice layer with a sol-gel material having a first refractive index, curing the sol-gel material, and adjusting a thickness of the cured sol-gel material until a predetermined height of the cured sol-gel material is achieved;
(c) removing the sacrifice layer; and
(d) filling a region from which the sacrifice layer has been removed with a sol-gel material having a second refractive index that is different from the first refractive index, curing the sol-gel material having the second refractive index, and adjusting a thickness of the cured sol-gel material until a predetermined height of the cured sol-gel material is achieved.

14. The method of claim 13, wherein the sacrifice layer is patterned in the space to form the color separation element, the color separation element is formed of the sol-gel material having the first refractive index, and the lower refractive index layer is formed of the sol-gel material having the second refractive index.

15. The method of claim 13, wherein the sacrifice layer is patterned in a remaining region other than a region for forming the color separation element, the lower refractive index layer is formed of the sol-gel material having the first refractive index, and the color separation element is formed of the sol-gel material having the second refractive index.

16. The method of claim 13, wherein processes (a) and (b) are repeated two times or more, and while repeating processes (a) and (b), the sacrifice layer is patterned so as to shift the space obtained by patterning the sacrifice layer, and after repeating processes (a) and (b) two times or more, processes (c) and (d) are performed to form the color separation element comprising a plurality of color separation sub-elements in a multi-stage structure, the plurality of color separation sub-elements being sequentially arranged along a traveling direction of incident light and shifted from one another.

* * * * *